(12) United States Patent
Hatakama et al.

(10) Patent No.: US 7,249,057 B2
(45) Date of Patent: Jul. 24, 2007

(54) PRODUCT INFORMATION SUPPLYING METHOD, PRODUCT INFORMATION ACQUIRING METHOD, PRODUCT INFORMATION REGISTERING METHOD AND RECORDING MEDIUM

(75) Inventors: Hiroshi Hatakama, Kawasaki (JP); Hiroji Koike, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 412 days.

(21) Appl. No.: 09/817,289

(22) Filed: Mar. 27, 2001

(65) Prior Publication Data

US 2002/0065735 A1 May 30, 2002

(30) Foreign Application Priority Data

Nov. 27, 2000 (JP) ............... 2000-358939

(51) Int. Cl.
*G06Q 30/00* (2006.01)
(52) U.S. Cl. ..................................... 705/26
(58) Field of Classification Search .................. 705/26, 705/27
See application file for complete search history.

(56) References Cited

U.S. PATENT DOCUMENTS

| 6,029,141 | A | | 2/2000 | Bezos et al. | |
|---|---|---|---|---|---|
| 6,092,049 | A | * | 7/2000 | Chislenko et al. | 705/10 |
| 6,405,175 | B1 | * | 6/2002 | Ng | 705/14 |
| 6,408,288 | B1 | * | 6/2002 | Ariyoshi | 706/22 |
| 6,438,579 | B1 | * | 8/2002 | Hosken | 709/203 |
| 2001/0004735 | A1 | * | 6/2001 | Kindo et al. | 705/37 |
| 2001/0021914 | A1 | * | 9/2001 | Jacobi et al. | 705/8 |
| 2001/0054082 | A1 | * | 12/2001 | Rudolph et al. | 709/217 |
| 2003/0216969 | A1 | * | 11/2003 | Bauer et al. | 705/22 |
| 2005/0027601 | A1 | * | 2/2005 | Walker et al. | 705/15 |

FOREIGN PATENT DOCUMENTS

| JP | 08-147318 | 6/1996 |
|---|---|---|
| JP | 11-288422 | 10/1999 |

OTHER PUBLICATIONS

Newsgroups, wwwDavidsBridal.com, Cristal Cook, ott.forsale. other, Wedding Dress, Mar. 5, 1997.*

(Continued)

*Primary Examiner*—Ronald Laneau
(74) *Attorney, Agent, or Firm*—Staas & Halsey LLP

(57) ABSTRACT

There is provided a product information supply method for supplying a user who desires to purchase a product with proper information about a related product that could be bought in combination with the product, so that the user is assisted in purchasing products. Registration of combination information to be supplied to the user is made with a database managed by a service provider server by a person who has bought the above product by means of a registration page so that a lot of combination information is accumulated in the database. The registered information includes not only information specifying a combinable product but also information about the effects of the combination and the ways of using products in combination. The database is searched in response to inquiry information from the user who makes reference to a page of products. Thus, corresponding combination information is extracted from the database and is sent to the user.

10 Claims, 10 Drawing Sheets

OTHER PUBLICATIONS

Kevin G. Barkes, A matter of Ethics, DEC Professional, vol. 14, No. 4, Apr. 1995, p. 44(2).*

U.S. Appl. No. 60/144,377.*

Office Action in corresponding JP Patent Application No. 2000-358939 mailed Feb. 28, 2006.

Keigo Inoue, Why and How to Release Homepage, Illustration-Based Basic Direction for Creating Homepage, Ai Publishing Co., LTD, Aug. 31, 2000, first edition.

Patent Abstracts of Japan for Japanese Publication No. 2000-105784, published on Apr. 11, 2000.

Patent Abstracts of Japan for Japanese Publication No. 10-083386, published on Mar. 21, 1998.

Japanese Office Action for corresponding Japanese Application No. 2000-358939 dated Aug. 29, 2006.

* cited by examiner

| TARGET-BASED MARKETING INFORMATION | |
|---|---|
| AGE-BASED | INFORMATION LIST OF COMBINATIONS OF RECOMMENDED PRODUCTS |
| PURPOSE-BASED | INFORMATION LIST OF COMBINATIONS OF RECOMMENDED PRODUCTS |
| TASTE-BASED | INFORMATION LIST OF COMBINATIONS OF RECOMMENDED PRODUCTS |
| etc. | |

| PURCHASER INFORMATION |
|---|
| PROFILE OF PURCHASED PRODUCTS |
| LIST OF PRODUCTS (RECOMMENDED PRODUCTS) THAT WERE NOT PURCHASED |
| ATTRIBUTES OF PURCHASER |
| etc. |

| PRODUCT DEVELOPMENT/ IMPROVEMENT INFORMATION |
|---|
| PRODUCTS THAT WERE NOT PURCHASED ALTHOUGH COMBINATIONS THEREWITH WERE RECOMMENDED |
| LIST OF ITEMS TO BE IMPROVED |
| LIST OF SALES CHANNELS |
| etc. |

MARKETING REPORT

We have analyzed information concerning a simultaneous purchase of notebook PC and PC carry case. Please use a set sales plan and product plan.

We have found that users of 20s and purchases of notebook PC "E" have a strong trend to choose "match in color/design" of the type of way of combining. For example, they comment "color is fit" or "design is good". The following combinations in terms of "match in color/design" are of good repute:

- notebook PC "A" and carry case "B"
- notebook PC "E" and carry case "F"

Many users over 50s comment "light" or "easy to carry."
The following combinations are of good repute:

- notebook PC "A" and carry case "B"

The age-based ratio of simultaneous purchase
- 10s ...... 3%
- 20s ...... 10%
- 30s ...... 8%
- 40s ...... 3%
- over 50s ...... 2%

FIG. 10

PRODUCT INFORMATION SUPPLYING METHOD, PRODUCT INFORMATION ACQUIRING METHOD, PRODUCT INFORMATION REGISTERING METHOD AND RECORDING MEDIUM

BACKGROUND OF THE INVENTION

1. Field of the Invention

The present invention relates to a method for providing a user who wishes to purchase a certain product via a network with information about related products that can be combined with the above product when purchasing the same. The present invention is also concerned with a method for enable the user to acquire information about related products. Further, the present invention relates to a method for enable a registered user to register information about related products.

2. Description of the Related Art

Recently, there has been an increased number of online shops from which users can purchase products via the Internet, and Web sites called online mall in which a plurality of online shops are gathered. On such Web sites, a user places a buy order by seeing a Web page that introduces products, choosing a product that he or she wants from among the introduced products, specifying the way of settling and personal information such as his/her address. The way of settlement may, for example, be a bank transfer, a credit card or electronic money.

Generally, the user who utilizes online sales service chooses a product that he or she wants from a list of products on a Web page and temporarily puts it in a shopping cart. This procedure is repeated until the user chooses all products that he or she wants. Then, the user places a buy order. It is generally said that 65% of the products that the user once chooses is cancelled until the user finally places the buy order. This shows that the user wavers in his/her choice of products during purchasing. It is therefore desired to provide means for assisting the user in purchasing. Such means is also important to online sales providers in terms of sales promotion.

Taking the above into consideration, there are some Web pages that present comments on products to the users. However, in practice, it is difficult to provide the users with valuable comments. There are also many Web sites that utilize an electronic bulletin board in which a variety of information about products can be written. However, there is no function of associating these Web sites with online shopping Web sites and providing the users with proper information. This fails to supply the user with useful information in shopping.

It is conceivable to employ a so-called cross sell in which products that could be bought in combination with a product that the user wants to buy are proposed so that the user can be stimulated to buy these products. For example, a peripheral device such as a printing machine could be combined with a personal computer that the user wants. A carry bag could be combined with a notebook type personal computer that the user wants. A guidebook could be combined with a computer software package. It is necessary to obtain information concerning products that can be combined with the original product. For example, a conventional online shop shows a product that was simultaneously bought together with the product that another user originally wanted to buy in the past. There is another method for collecting information by data mining for POS data or the like and analyzing the results of data mining. However, either of these methods makes it possible to extract information about only combinable products. In other words, these methods could not bring about tangible information concerning, for example, effect, usage and notes resulting from the combination of products. Thus, the conventional method could not greatly assist purchasing.

SUMMARY OF THE INVENTION

Taking the above into consideration, an object of the present invention is to provide a product information supply method for supplying a user who desires to buy a product with proper information about a related product that could be bought together with the desired product, a product information acquiring method for enabling the user to acquire combination information, and a product information registering method for making registration of combination information.

To accomplish the object, according to the present invention, there is provided a product information supply method for supplying a terminal of a user who desires to purchase a product via a network with information about a related product that could be bought together with the desired product. This method includes the steps of: receiving combination information about combinations of products from a terminal of a person who has bought the products, and making registration of said combination information with a database, so that the combination information can be accumulated; and searching the database in response to inquiry information about the combination information from the terminal of the user to supply the terminal of the user with corresponding combination information extracted from the database on the basis of the inquiry information.

To accomplish the object, according to the present invention, there is provided a product information acquiring method for acquiring information about a related product that could be bought together with a product that a user operates a terminal to buy via a network. The method includes the steps of: sending inquiry information about combination information concerning a combination of the product and the related product to a server that manages a database storing the combination information that has been registered by a person who has bought the product; and outputting, from the server, corresponding combination information extracted from the database by search of the database based on the inquiry information.

To accomplish the object, according to the present invention, there is provided a product information registering method for making registration of information about a related product that could be bought together with a product that a user operates a terminal to buy via a network. The method includes the steps of: entering given items of combination information by the terminal of the user by means of an e-mail or access to a Web page for making registration of combination information; and sending the given items of combination information to a server that manages a database for storing the combination information.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 9(A), 9(B) and 9(C) show examples of pieces of marketing information, and more particularly show target-based marketing information, purchaser information and product development/improvement information; and FIG. 10 is a view of an example of the contents of produced marketing information.

DESCRIPTION OF THE PREFERRED EMBODIMENTS

A description will now be given of an embodiment of the present invention with reference to the accompanying drawings.

Figure 1:
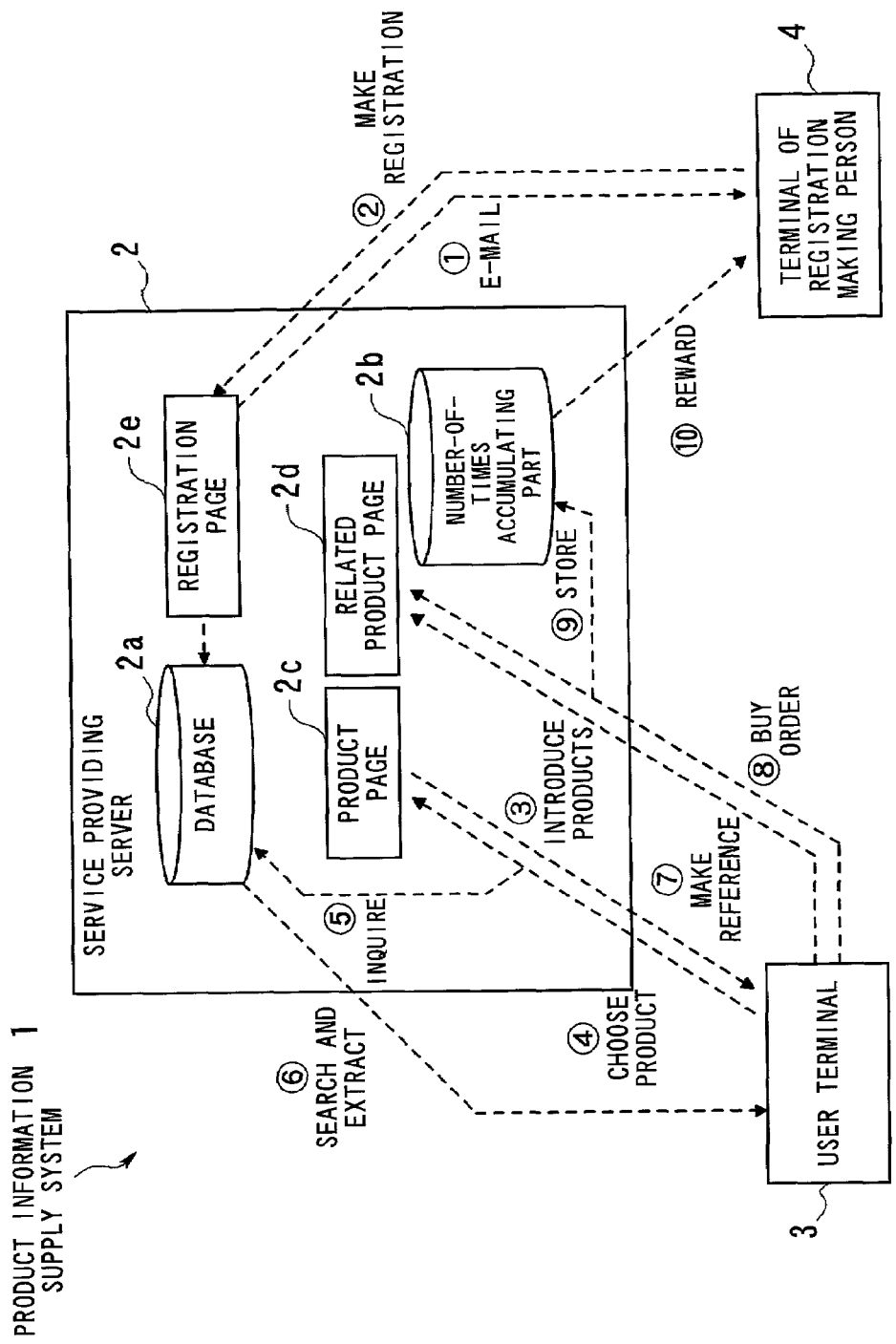
FIG. 1 schematically illustrates a process in the product information supply system.

First, an outline of the present invention is described by describing a product information supply system that embodies a product information supplying method, a product information acquiring method and a product information registering method of the present invention. FIG. 1 schematically illustrates a process in the product information supply system.

A product information supply system 1 is made up of a service providing server 2, a user terminal 3, and a terminal 4 used by a person who makes registration of information. The service provider server 2 provide online sales service and product information supplying service. The user terminal 3 is operated by a user who utilizes service. The terminal 4 is operated by a person who makes registration of information. The service providing server 2 includes a database 2a that stores combination information to be supplied to users, and a number-of-times accumulating part 2b that stores information about the number of times a placement of a buy order has been made in order to calculate a reward to be given to the person who makes registration of information. The service providing server 2 provides a Web page 2c for introducing products on sale (hereinafter referred to as a product page), a Web page 2d for introducing related products (hereinafter referred to as a related product page) into users, and a Web page 2e for registering information to be stored with the database 2a (hereinafter referred to as a registration page). The service providing server 2 is a Web server that provides Web pages via a network such as the Internet. More particularly, the service providing server 2 provides an online shop or an online mall that sells products via a network such as the Internet. The user terminal 3 and the terminal 4 used by the person who makes registration of information are information processing apparatuses capable of seeing Web pages, such as a personal computer. The terminals 3 and 4 are connected to the service providing server 2 via a network such as the Internet.

In practice, the system would have a large number of terminals, although the system 1 in FIG. 1 is illustrated so as to have only one user terminal 3 and only one terminal 4 used by the registration making person. As will be described later, the database 2a may be provided in a server installed outside of the service providing server 2. The function of the number-of-times accumulating part 2b may be implemented by the database 2a.

In the product information supply system 1, the service providing server 2 provides the user terminal 3 with a plurality of product pages 2c that are Web pages for introducing products on sale into an online shop or mall and allowing the user to place a buy order through his/her click operation. The service providing server 2 provides the user who looks at the product pages 2c with combination information about combinations of products extracted from the database 2a. If a related product that could be bought together with an original product is available, the combination information contains information identifying the related product and information about the combination with the original product. The information about the combination with the original product contains information concerning effect, usage and notes resulting from the purchase of the related product with the original product. The user can acquire beneficial information about the purchase of products from the combination information. Further, the combination information could guide the user in accessing the related product page 2d within the online shop or mall, and could facilitate sales promotion.

The registration of the combination information with the database 2a can be made from the terminal 4 used by the person who makes registration of combination information via the registration page 2e set up for use in registration of information or an e-mail. The person who makes registration of information may be a user who bought the corresponding product in the past. In this case, combination information that reflects the experience of the person who makes registration can be accumulated in the database 2a. Also, as will be described later, the previous purchase of products by the person who makes registration of information may utilize service provided by the service providing server 2. In this case, the user who utilizes the service is also the person who makes registration of information. In this case, the terminal 3 also function as the terminal 4.

Operation of the product information supply system 1 is described immediately below. The service providing server 2 refers to a list of the products purchased in the past, and calls the users who bought the products in the past to make registration of combination information via e-mails. A person who responds to the call accesses the registration page 2e from the terminal 4, and enters given items of combination information, which are then sent to the service providing server 2. Alternatively, the entered items of combination information may be set by an e-mail. The items of combination information entered by the person who makes registration of information may include information identifying related products combinable with each other, information about combinations, and information identifying the person who registers information. The combination information may also include profile information about the person who makes registration of information, such as his/her age and job. The combination information may include a product that is available in another online shop in an online mall provided by the service provider server 2. The server 2 registers the received combination information with the database 2a. The combination information could be registered by a plurality of users. For each product, related combinable products are registered with the database 2a and accumulated therein.

A user who desires to buy a product accesses, via the terminal 3, the Web site in the online shop or mall set up by the service providing server 2, and browses through the product pages 2c that describe information about the products on sale. When the user clicks a product to choose it as a candidate for purchase, the terminal 3 sends a choice signal to the service providing server 2. Upon receiving the choice signal, an inquiry about the combination information regarding the chosen product is automatically made with respect to the database 2a. The inquiry may automatically be made upon receipt of a given signal for a buy order or a request for combination information from the user.

The database 2a is searched, so that combination information that describes the chosen information can be extracted therefrom and sent back to the user terminal 3. This search is conducted so that the information identifying the product is used as a key for searching. Alternatively, the search may be conducted by referring to the user's profile. The information sent back to the user may include information about related product combinable with the product of interest, information about the combination, and link information directed to the related product page 2d that introduces related products into the users. The information is displayed at the user terminal 3 and may be printed out as necessary. A plurality of pieces of combination information may be supplied with regard to a single product. Also, combination information about a product that was bought by many users based on this combination information may be supplied in preference. Further, a special comment or users' evaluation may be provided. For example, a special comment would describe that many users have bought this product.

If the user is interested in the combination information, he or she operates the terminal 3 to access the related product page 2d and see information about the related products provided thereon. The related product page 2d is one of the pages that introduce products available in online shops or malls provided by the service providing server 2 into the users. The user sees the related product page 2d and orders a related product, the terminal 3 sends the signal indicating a purchase order to the service providing server 2. Then, the server 2 performs a predetermined process for the received buy order to make a contract with the buy order. The number-of-times accumulating part 2b accumulates, for each piece of combination information or each person who makes registration of combination information, a numeral value indicative of the number of times a purchase of related products has been made based on reference made to the combination information. The value is incremented each time the buy order is received from the terminal 3 and is processed.

The person who makes registration of information receives a reward based on the value stored in the number-of-times accumulating part 2b from the service provider. The user may receive the reward via, for example, a cash transfer, a gift certificate, electronic money or a digital discount coupon usable in the online shops or malls. The value indicating the number of times a purchase has been made may be incremented when the user sees the combination information supplied by the server 2 and accesses the related product page 2d via the link. The reward is given to the person who made registration of combination information that stimulated the user to access the Web page that introduces a product related to the original product into the user so that the related product was actually sold.

The user who bought the product is called to make registration of combination information at a given time after purchasing. The way of calling the user to make registration is the same as that of registering combination information via the terminal 4. That is, the user uses an e-mail or accesses the registration page 2e to make registration of combination information. Then, the user will receive a reward if the combination information registered by him or her is referred to by another user and leads this user to the actual purchase of a product.

As described above, the product information supply system 1 supplies the users with the combination information about the products related to the products bought by the users who made registration of the combination information. Thus, the server 2 can supply the users with proper information about related products that could be bought in combination so that the users can be assisted in purchasing. The server 2 brings about an advantage to the sales service provider. The users could be stimulated to have access to the related product page 2d by the combination information, so that the sales of the online shops or malls can be promoted and the sales figures can soar. Further, the system 1 could be clearly distinguished over other online sales service and could have an increased marquee. This is because the number of times reference or purchase has been made is incremented when the user refers to the combination information or actually purchases the related product. The user who has registered the combination information receives a reward based on the number of times of utilization of his/her combination information. This system would facilitate making registration of combination information.

It may be possible to utilize, for another purpose other than rewarding, the information stored in the number-of-times accumulating part 2b indicating the number of times a purchase of related products has been made or the number of times access to the related product page 2d has been made. An example of utilization is as follows. When the user terminal 3 is supplied with combination information regarding a plurality of combinations with the original single product, the server 2 preferentially sends the user combination information that is comparatively frequently utilized on the basis of the data stored in the number-of-times accumulating part 2b. Thus, the user would receive highly reliable combination information. Additionally, the server 2 may supply the user with information concerning the degree of interest of each piece of combination information dependent on the degree of frequency of utilization of combination information based on data stored in the number-of-times accumulating part 2b. This would make it possible for the user to know accuracy of information supplied by the server 2.

In the above description, the database 2a is provided in the service providing server 2. Alternatively, the database 2a may be provided in an exclusively used information supply server separate from the service providing server 2. In this case, a Web site set up by the server 2 performs only online sales service, while the other server is connected to the server 2 via the network and provides the Web site with combination information about combinable products using the database 2a. More particularly, the service providing server 2 receives the product choice signal from the user, and sends an inquiry about combination information regarding the selected product to the information supply server. Then, this server searches the database 2a and extracts corresponding combination information therefrom. The extracted combination information is sent to the terminal 3 via the service provider server 2 or directly. This makes it possible for a plurality of Web servers to commonly use the service function of providing combination information via the network.

Figure 2:
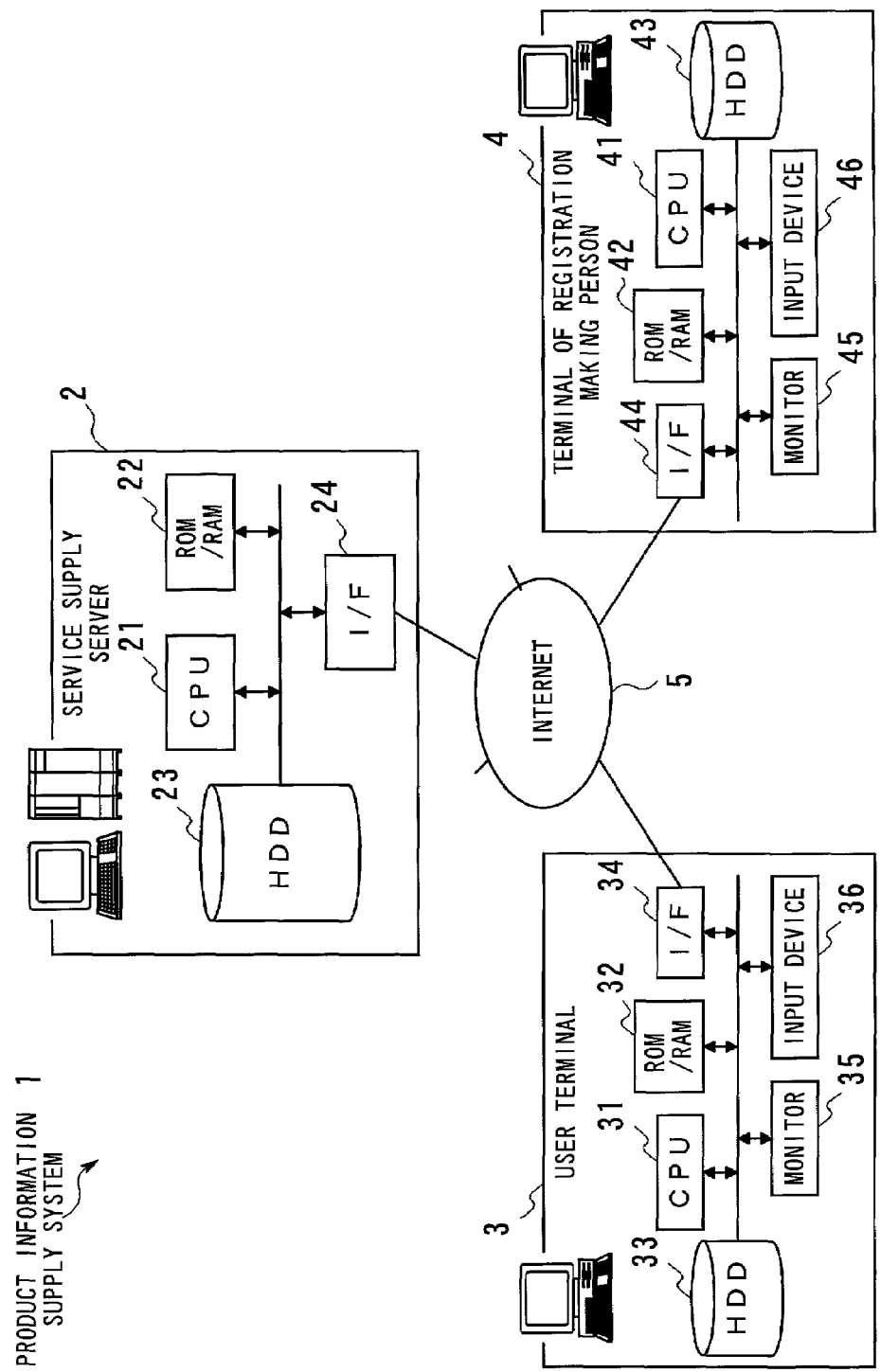
FIG. 2 schematically illustrates a configuration of the product information supply system according to an embodiment of the present invention.

A description will be given of an embodiment of the present invention. FIG. 2 schematically illustrates a configuration of the product information supply system 1 according to an embodiment of the present invention.

The system 1 includes the service providing server 2, the user terminal 3 and the terminal 4 used by the registration making person. These structural devices are electrically connected via the Internet 5 including public communication lines.

The service providing server 2 includes a CPU (Central Processing Unit) 21, a ROM (Read Only Memory)/RAM (Random Access Memory) 22, a hard disk drive (hereinafter simply referred to as HDD) 23, and an interface (hereinafter simply referred to as I/F) unit 24. The CPU 21 includes a processor and controls the entire system. The ROM/RAM 22 stores various control programs and serves as an auxiliary memory unit. The HDD 23 stores various process programs and data. The I/F unit 24 makes a connection with the Internet 5 to send and receive data to and from the Internet 5. The HDD 23 stores data forming a Web page that introduces products on sale into the users and receives a buy order, a database having combination information that is to be supplied when the user looks at the Web page, and a service program for providing users with sales service based on the information in the database. The CPU 21 reads and executes the service program in the HDD 23, so that the service providing server 2 acts as a Web server that provides a Web site for providing sales service in the form of an online shop or mall.

The service providing server 2 introduces products on sale into the user upon access from the user terminal 3, and provides the user with a Web page on which the user can place a buy order by a click operation. Further, the server 2 supplies the user who has access to the above Web page with combination information extracted from the database stored in the HDD 23. If a related product that could be bought together with an original product is available, the combination information contains information identifying the related product and information about the combination with the original product. The combination information is mainly directed to assisting the user in purchasing products.

The user terminal 3 is an information processing apparatus such as a personal computer that is made up of a CPU 31, a ROM/RAM 32, an HDD 33, an I/F unit 34, a monitor 35, and an input device 36 such as a keyboard and a mouse pointer. The terminal 4 used by the person who makes registration of combination information is an information processing apparatus made up of a CPU 41, a ROM/RAM 42, an HDD 43, an I/F nit 44, a monitor 45 and an input device 46. The HDDs 33 and 43 of the terminals 3 and 4 store browser programs for having access to the Internet 5 and opening Web pages, and a program for sending and receiving an e-mail. The user launches the browser in the user terminal 3 to have access to the service providing server 2 and open the Web page that introduces products on sale in the browser. The user may place a buy order and receive combination information retrieved by the service providing server 2. The terminal 4 is used to make registration of combination information with the database of the service providing server 2.

In practice, the system 1 would have a large number of terminals, although the system 1 in FIG. 2 is illustrated so as to have only one user terminal 3 and only one terminal 4 of the registration making person. The function of the terminal 4 may be realized by the user terminal 3. That is, the user terminal 3 also has the function of making registration of combination information implemented by the terminal 4 used by the person who makes registration.

Figure 3:
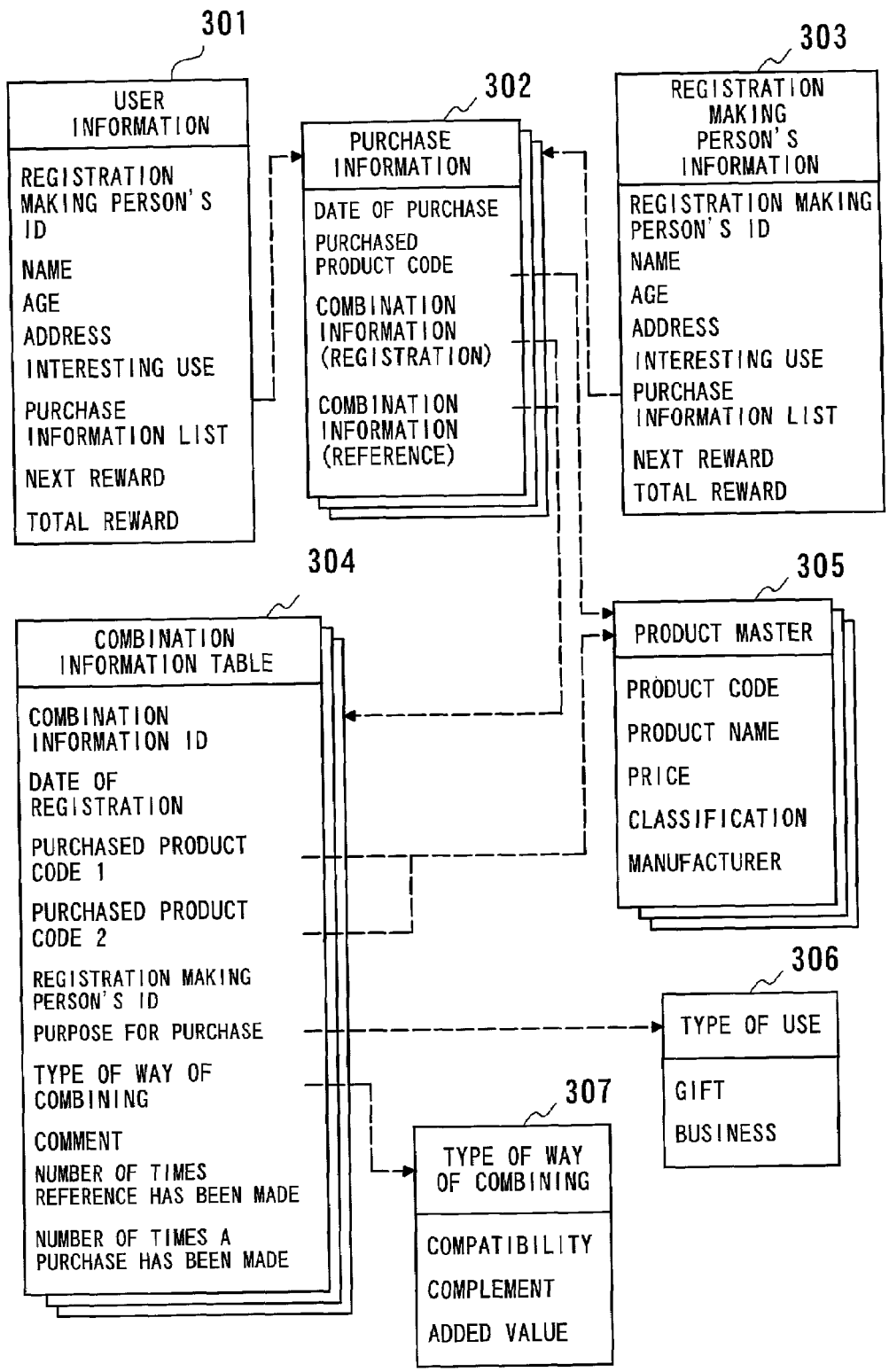
FIG. 3 is a view of a configuration of a database of combination information.

FIG. 3 shows an example of a configuration of a database of combination information stored in the HDD 23 of the service providing server 2.

The database of the combination information contains user information 301, purchase information 302, registration making person's information 303, a combination information table 304, a product master 305, a type of use 306, and a type of way of combining 307. Data is classified and stored in accordance to these pieces of information in the database. The user information 301 stores personal information about users who had accessed the Web sites of sales service. The purchase information 302 is created by the purchase of a product by the user. The registration making person's information 303 stores personal information about a person who has made registration of combination information stored in the database. The combination information table 304 stores the contents of the combination information. The product master 305 describes a product on sale. The type of use information 306 stores types of use of products. The type of way of combining 307 stores types of the way to combine products in purchasing.

The user information 301 is information about the user who utilizes the sales service provided by the service providing server 2, and contains items of information that may be "registration making person's ID", "name", "age", "address", "interesting use", and "purchase information list". The "registration making person's ID" is assigned to each user. The item "interesting use" indicates a use of a product that the user is now interested in. The item "purchase information list" shows a list of pieces of purchase information 302 respectively describing the products that the user has bought. When a person has made registration of combination information, the user information 301 includes items of "next reward" and "total reward". The item "next reward" shows a reward for the next time based on access to the combination information by another. The item "total reward" shows the total of the rewards which have already been given. The registration making person's information 303 is concerned with a person who bought a product in the past and makes registration of combination information about that product. The registration making person's information 303 includes items of "registration making person's ID", "name", "age", "address", "interesting use", "next reward", and "total reward". When the user has bought a product by using the sales service, the registration making person information 303 includes an item "purchased product information".

The purchase information 302 is created when the user purchases a product using the sales service, and includes items of information "date of purchase" and "purchase product code" identifying the purchased product. If the combination information about the purchased product at that time have been stored, an ID of the above combination information is described in "combination information ID (registration)". If the purchase was made based on reference of the combination information supplied to the user, an ID of the present combination information is described in an item "combination information ID (reference)". The details of the product specified by "purchased product code" are described in the product master 305. The product master 305 describes, for each product, items of "product code", "product name", "price", "type", and "manufacturer".

The contents of the combination information corresponding to the ID of the combination information are described in the combination information table 304. The combination information table 304 includes "combination information ID", "date of registration", "purchased product code 1", "purchased product code 2", "registration making person's ID", "purpose for purchase", "type of way of combining", and "comment". The "purchased product code 2" identifies the original product described in the purchase information 302. The "purchased product code 2" identifies the related product that is described in combination with the original product and is described in the purchase information 302. The registration making person's ID identifies the person who has made registration of the combination information. The "purpose for purchase" serves as information about the combination and indicates what the purchase of the related product is useful to. The "type of way of combining" describes a relationship between the combined products. The "comment" describes a comment on the combination. If a user of the sales service uses the combination information to see the page that introduces related products into the users and actually buy a related product, the number of times reference has been made to the combination information is described in "number of times reference has been made", and the number of times a purchase of the related product has been made is described in "number of times a purchase has been made". These items of information are used as a reference for calculating a reward given to the person who makes registration of combination information and also are used as a reference showing the degree of accuracy and quality of the combination information.

The contents of information that can be described in the "purpose for purchase" and "type of way of combining" in the combination information table 304 are also described in the type of use 306 and the type of way of combining 307, respectively. The type of use 306 is used to describe the purpose of purchase such as "gift" and "business". The type of way of combining 307 is used to describe a relationship between the combined products such as "compatibility", "complement" and "added value".

A description will be given, with reference to FIG. 3, of a process for making registration of combination information and supplying the user with combination information in the product information supply system 1.

In the process for making registration of combination information with the database of the service providing server 2, the server 2 refers to the purchase information 302 and extracts the users who have bought a target product therefrom. Then, the server 2 sends an e-mail to the extracted users in order to ask to make registration of combination information. A skillful agency other than the service provider may be asked to send e-mails to the users. The users to which an e-mail should be sent may be specified by using a purchase list owned by a manufacturer of products. A person who receives the e-mail via the terminal 4 utilizes link information described therein to access the Web page for making registration of information provided by the service providing server 2. Then, the server 2 provides the terminal 4 with the Web page for use in making registration of information. A piece of registration making person's information 303 about the user who has accessed the Web page is created in the database.

The person who makes registration enters combination information on a registration screen in the Web page, and sends the entered combination information to the service providing server 2. This may be sent to the server 2 via an e-mail. The service providing server 2 automatically makes registration of combination information with the information table 304 in the database.

Figure 4:
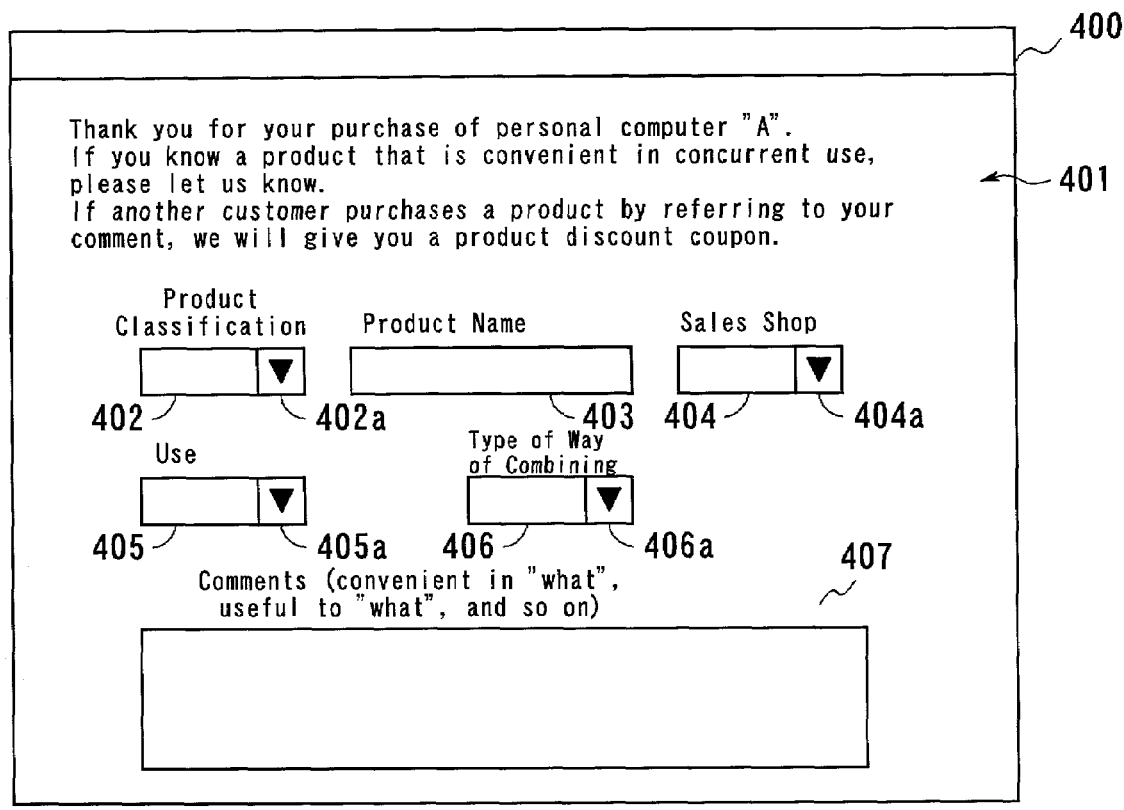
FIG. 4 is a view of an example of a screen for making registration of information with a database.

FIG. 4 illustrates an example of the registration screen that is provided to a person who makes registration of combination information.

A registration screen 400 shown in FIG. 4 is an example of a screen displayed at the terminal 4. The registration screen 400 is provided to a user who has bought a personal computer named "A". On the screen 400, boxes 401 through 406 appear together with a message 401 which asks the user to make registration of combination information. The box 402 is used to choose a category of product. The box 403 is used to enter the name of a related product to be combined. The box 404 is used to choose the name of a sales shop in the online mall in which the related product is on sale. The box 405 is used to choose use of the related products. The box 406 is used to choose a type of way of combining. The box 407 is used to enter a comment about the combination. When arrow parts 402a, 404a, 405a and 406a respectively attached to the boxes 402, 404, 405 and 406 are clicked, selectable input items come out. The user uses the keyboard to enter his/her comment in the box 407.

The items of information specifying a combinable product are entered in the boxes 402, 403 and 404. The items of information concerning the combination are entered in the boxes 405, 406 and 407 in order to supply the user with the combination information. For example, information entered in the box 405 shows what use and scene the information is useful to in association with the type of use 306 in the database shown in FIG. 3. For example, information entered in the box 405 may relate to the categories such as gift, business, use in the network, fashion, love affairs, mobile use, or excellent cuisine. The information entered in the box 405 also shows what effect is brought by the combination in association with the type of way of combining 307. For example, the information in the box 405 may relate to compatibility, complement, added value, match in color or design, success/failure, notice, or unique way to use. The box 407 is used to freely describe a short sentence or sentences showing what convenience the combination results in or what the combination is useful to. It may be possible to enter other items of information on the registration screen 400, such as profile information concerning the name of the person who makes registration, age, address, and hobby, and information as to whether the user allows the service provider to show part of the profile information to another user. Alternatively, these additional items of information may be entered on another screen.

The information that is entered by the person who makes registration of information is stored in the combination information table 304 in the database configuration. The "combination ID" assigned due to the registration making and "date of registration" are written in the combination information table 304. If the person who makes registration has been registered with the database as a user of the sales service or a person who has made registration of combination registration, the ID of the person who has made registration is registered with the table 304. Each time a person makes registration of information, the combination table 304 is created and stored in the database as a candidate for a piece of combination information that may be supplied to the user.

Figure 5:
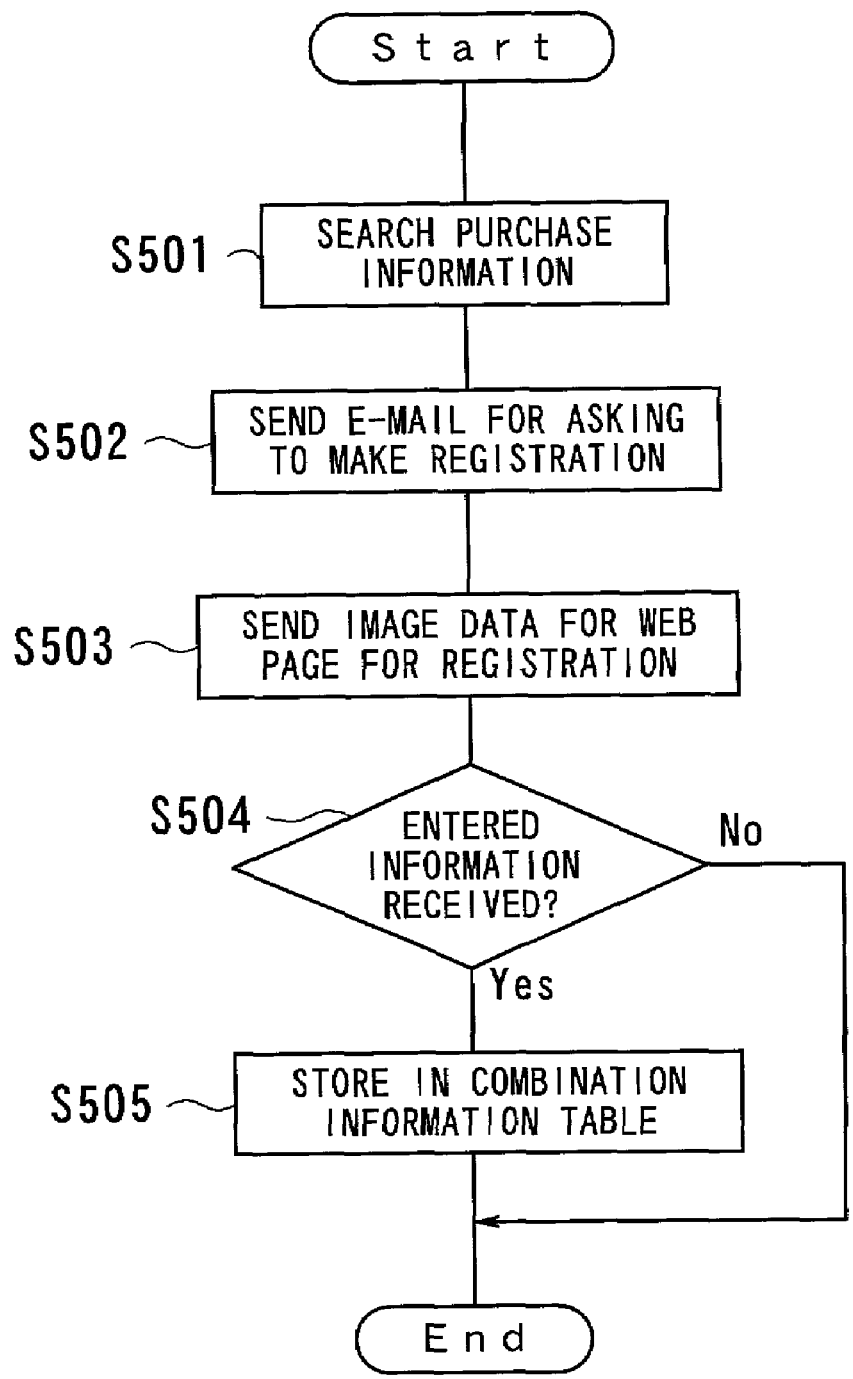
FIG. 5 is a flowchart of a process for making registration of combination information with a database in a service providing server.

FIG. 5 is a flowchart of a process for making registration of combination information executed by the service providing server 2.

In step S501, the service providing server 2 searches the purchase information 302 in the database in the HDD 23, and extracts the purchasers who have bought a target information therefrom. In step S502, the server sends an e-mail to the extracted purchasers to ask them to make registration of combination information. In step 503, the server receives access from a person who is willing to make registration, and sends image data for forming the Web page for use in making registration of information to the terminal 4. In step S504, the server 2 determines whether information that has been entered in the Web page by the person has been received. If the answer is NO, the server 2 ends the process. If the answer is YES, the server 2 proceeds to step S505. In step S505, the server 2 stores the received information in the combination table 304, so that the combination information can be automatically registered therewith.

Next, a description will be given of supply of the combination information to the users of the sales service.

A user of the sales service accesses to the service providing server 2 by the user terminal 3, and sees a Web site of the sales service. The user uses this Web site as follows. The user puts a product introduced in an online shop set up in the Web site in a virtual shopping cart. This is a provisional choice of product. Then, the user goes around the online shop and puts another product in the shopping cart. After the user puts all products that he or she wants in the shopping cart, the user places a buy order of these products. The user may not buy a product that has been put in the shopping. The bill of the ordered products is settled, for example, by electronic money or bank transfer.

When the user chooses a product and puts it in the shopping cart, the service provider 2 receives the corresponding choice signal and searches the database in order to extract combination information about products related to the product that the user has chosen. This search is conducted in such a way as to refer to the combination table 304 in the database and extract combination information having "purchased product code 1" that coincides with the product code. The combination information thus extracted is sent to the user terminal 3. The user would see the combination information and access a related page on which related products are introduced. Then, the user may purchase a related product. The search of the combination information may be conducted when the user places a buy order of the related information or checks out the online mall.

Figure 6:
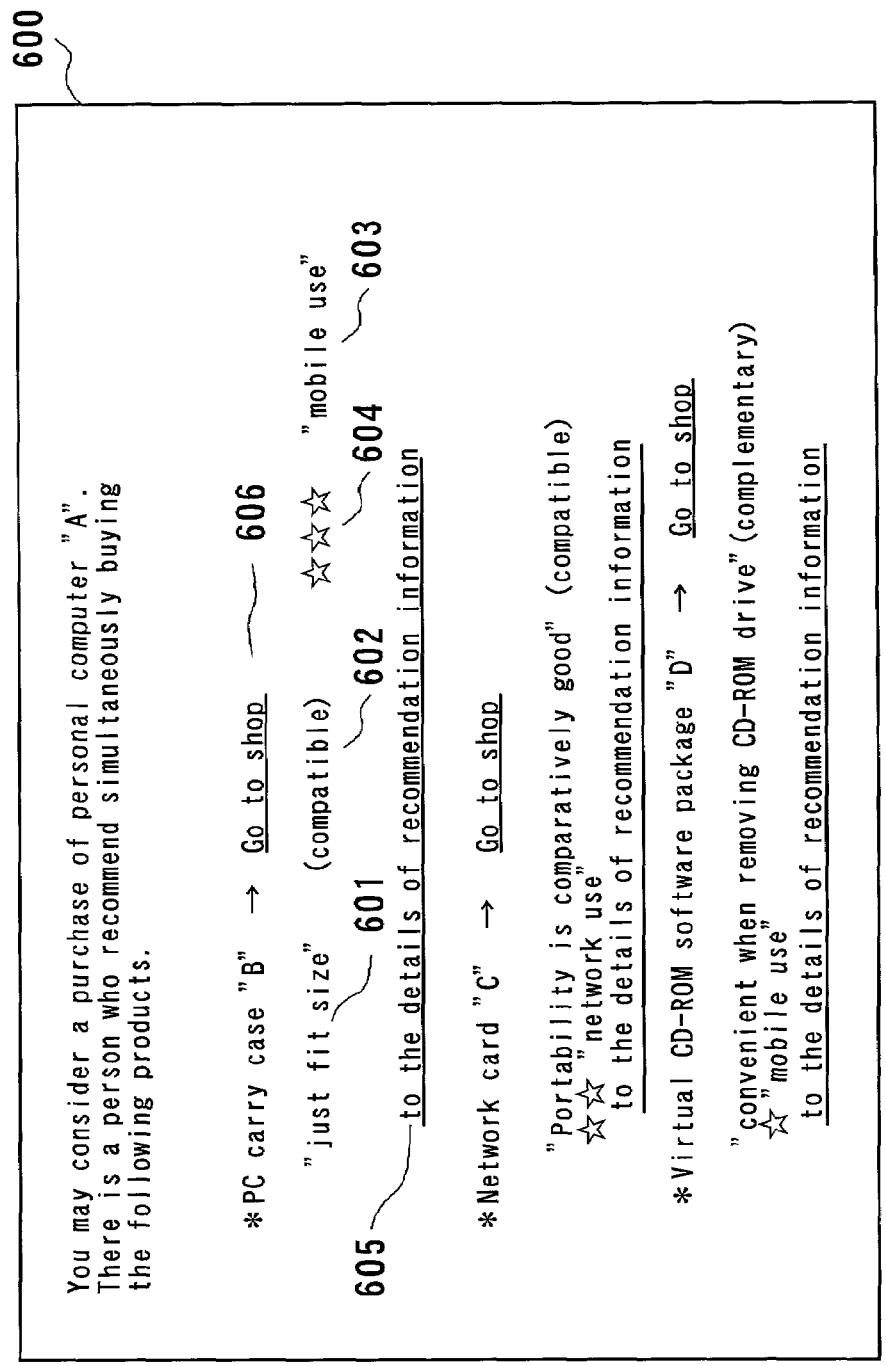
FIG. 6 is a view of an example of a screen for displaying combination information.

FIG. 6 illustrates an example of a screen that displays combination information on the monitor 35 of the user terminal 3.

A display screen 600 shown in FIG. 6 shows a plurality of pieces of information concerning related products that could be combined and bought as shown in FIG. 3. More particularly, FIG. 6 shows three products "B", "C" and "D" as related products. As to each of the related products, three display parts 601, 602 and 603 are provided together with the name of related product. For example, the display parts 601, 602 and 603 show a comment on the related product, what effect is brought by the combination, and what use and scene the related product is useful to. The items of information respectively displayed in the display parts 601, 602 and 603 are respectively extracted from the items of "comment", "type of way of combining" and "type of use" included in the combination information table 304. The items of information displayed in the display parts 601, 602 and 603 are primarily directed to a beneficial effect resulting from the combination with the original product (that is personal computer "A" in FIG. 6). It may also be possible to display a notice to be considered at the time of purchasing the related product or a caution message describing a negative matter such that the related product is not recommended.

The degree of usefulness or reliability of the combination information or information indicative of the degree of interest of the combination information by other users is represented by the number of stars in the display part 604. The number of times reference has been made to the Web page having the display screen 600 that introduces the related products is recorded in the item "number of times of reference made" of the combination information table 304 formed in the database of the service providing server 2. Similarly, for each of the related products displayed on the screen 600, the number of times a purchase of the related product has been made is recorded in the item "number of times a purchase has been made" of the combination information table 304. The number of starts in the display part 604 is based on the number of times reference has been made and the number of times a purchase has been made. That is, the degree of usefulness or interest of the combination information depends on the degree of frequency of utilization of the combination information, such as the number of times reference has been made to the Web page that introduces the related products based on the combination information supplied by another user or the number of times a purchase of the related products has been made.

The reliability of combination information could be enhanced by providing the service with the function of accepting a compliant from the users. The service providing server 2 decrements the number of starts in the display part 604 related to the piece of combination information about a related product against which a compliant has been made. The piece of combination information may be deleted from the related products listed on the screen 600.

Pieces of link information are displayed in link display parts 605 and 606. The piece of link information in the link display part 605 indicates a link to a Web page that introduces related products into the users. The piece of link information in the link display part 606 indicates a link to the front page of an online shop that has related products on sale. The user will click the link display part 605 if the display screen 600 stimulates him or her to see the details of a related product displayed thereon. This opens the corresponding Web page in the browser, so that the user can put the related product in his/her shopping cart and place a buy order.

A choice button for requesting a display of the combination information may be provided to the Web page in which the original product is introduced. The user clicks the choice button to conduct the search. The choice button may be an advise button that requests an advice about a related product combinable with the original product whose use is displayed. The choice button may be a check button that requests information about compatibility, an example of success or failure, or a notice with regard to the combination of the original product and the related product. The items of "type of use" and "type of way of combining" in the combination information table 304 of the service providing server 2 are the subject search items.

At the time of searching the database, the profile information about the user stored in the user information 301 may be referred to in order to extract combination information that has been registered by a person having a similar profile. At that time, given subject search items included to the user information 301, such as profile information about age and job and "interesting use". The server refers to the information 303 about the person who has made registration and corresponds to the registration making person's ID described in the combination information table 304 of the corresponding product. Then, the items of information of record corresponding to the subject search items are compared with the items of user information. The combination information that includes a lot of items matched with those of the user information is provided to the user in preference.

The service providing server 2 may have a list of products that have been purchased or those under consideration. Combination information concerning the products on the list and products under consideration may be extracted. The screen 600 for displaying the combination information may be designed to have the function of sending an inquiry to the person who has made registration of combination information via an e-mail or electronic bulletin board. This function may be implemented by providing the screen 600 with information about a link to the e-mail address of the person who has made registration or the electronic bulletin board. The user would easily communicate with the person who has made registration of combination information to directly ask him or her about his/her combination information. The user could obtain more accurate combination information. If the person who has made registration directly receives a communication from the user, the service providing server 2 stores the number of times direct communication has been received, which may be based on a reward given to the person who has made registration.

After supplying the user with the combination information, the "number of times reference has been made" and the "number of times a purchase has been made" included in the information table 304 stored in the database of the service providing server 2 are incremented when the Web page for introducing the related products into the users is referred to by the user or a related product is purchased. The items of the "number of times reference has been made" and the "number of times a purchase has been made" are based on calculation of a reward that is to be given to the person who has made registration of the combination information. The person who has made registration may periodically receive a cumulative reward thus calculated, for example, via electronic money or a gift certificate.

The provider who manages the service providing server 2 may receive a reward from a person who asks the provider to place the related products on the Web page or from a manufacturer or a seller who manufactures or sells the related products, when the user refers to the Web page or purchases a related product. The reward is based on the fact that the provider guides the user in seeing the page that introduces the related products into the users and purchasing the related product.

Figure 7:
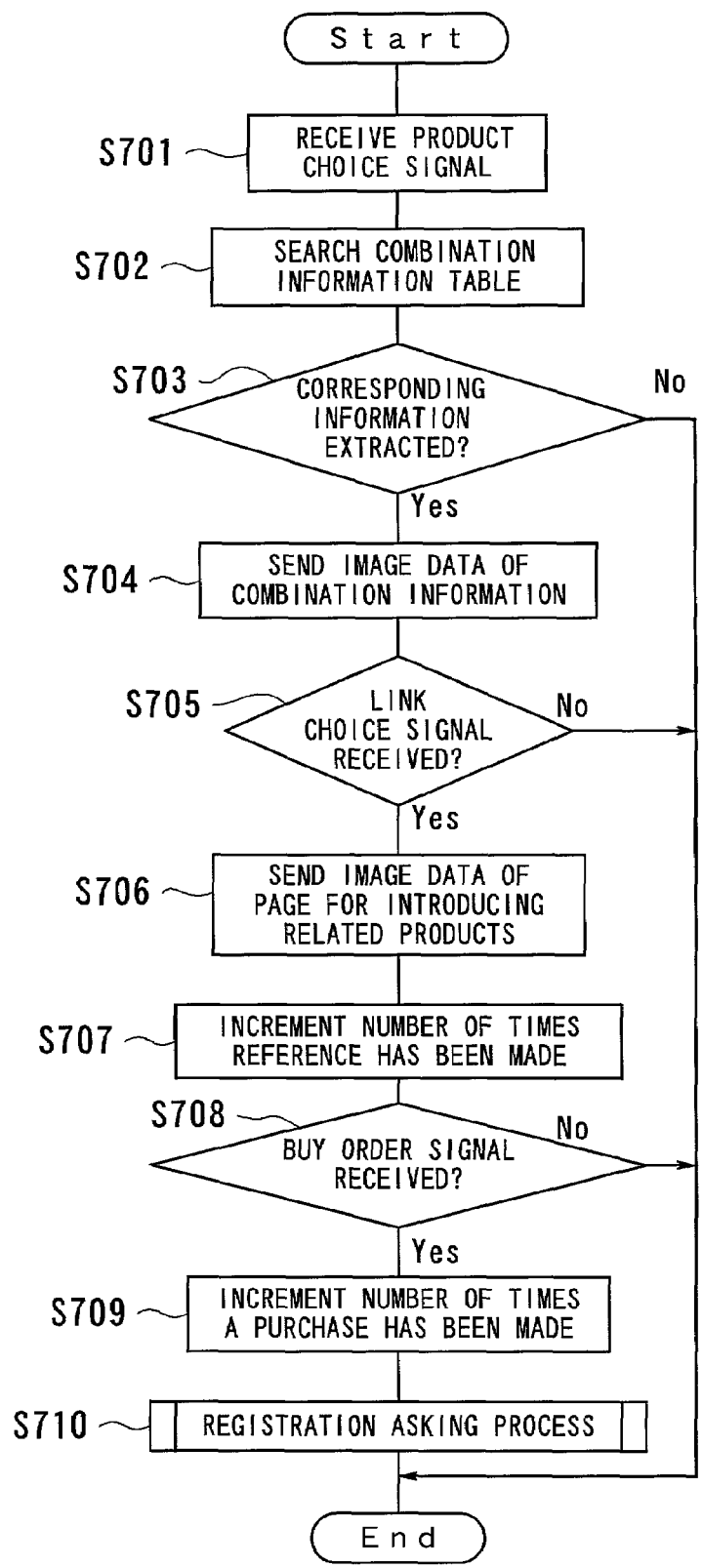
FIG. 7 is a flowchart of a process for a supply of combination information in the service providing server.

FIG. 7 is a flowchart of a process for supplying the user with combination information executed by the service providing server 2.

When the process shown in FIG. 7 is initiated, the service providing server 2 waits for a signal from the user terminal 3 which has received image data forming a Web page for introducing products selected by the user. A piece of user information 301 about the user is created in the database. In step S701, the service providing server 2 receives, from the user terminal 3, a choice signal that is generated by a choice of a product made by the user. At step S702, the search of the combination information table 304 formed in the database in the HDD 23 is conducted. In step S703, it is determined whether combination information about the corresponding product has been extracted from the information table 304. If the answer of step S703 is YES, the process proceeds to step S704. If the answer is NO, the process ends.

At step S704, image data that displays the extracted combination information is produced and sent to the user terminal 3.

In step S705, it is determined whether a choice signal generated by choosing a link to a Web page that introduces related products indicated in the combination information has been received. If such a choice signal has been received, the process proceeds to step S706. If not, the process ends. In step S706, image data forming a page that introduces related products is read from the HDD 23, and is forwarded to the user terminal 3. In step S707, the value of the item "the number of times reference has been made" in the combination information table 304 extracted by the search conducted in step S702. In step S708, it is determined whether a signal that places a buy order of the related product included in the combination information has been received. If such a signal has been received, the process proceeds to step S709. If not, the process ends. In step S709, the value of the item "the number of times a purchase has been made" in the combination information table 304 extracted by the search conducted in step S702 is incremented. A piece of purchase information 302 resulting from the buy order thus placed is created in the database. Further, the value of the "combination information ID" shown in the extracted combination information table 304 is described in the item "combination information (reference)".

In step S710, executed is a process for asking the user who has bought a related product based on the supplied combination information to make registration of combination information about the combination of the related product and the original product. The process for making registration is composed of steps S503 through S505 in the flowchart of FIG. 5. That is, image data forming the Web page for making registration of combination information is sent to the user terminal 3. When information is entered to the Web page, the entered information is stored in the combination information table.

Figure 8:
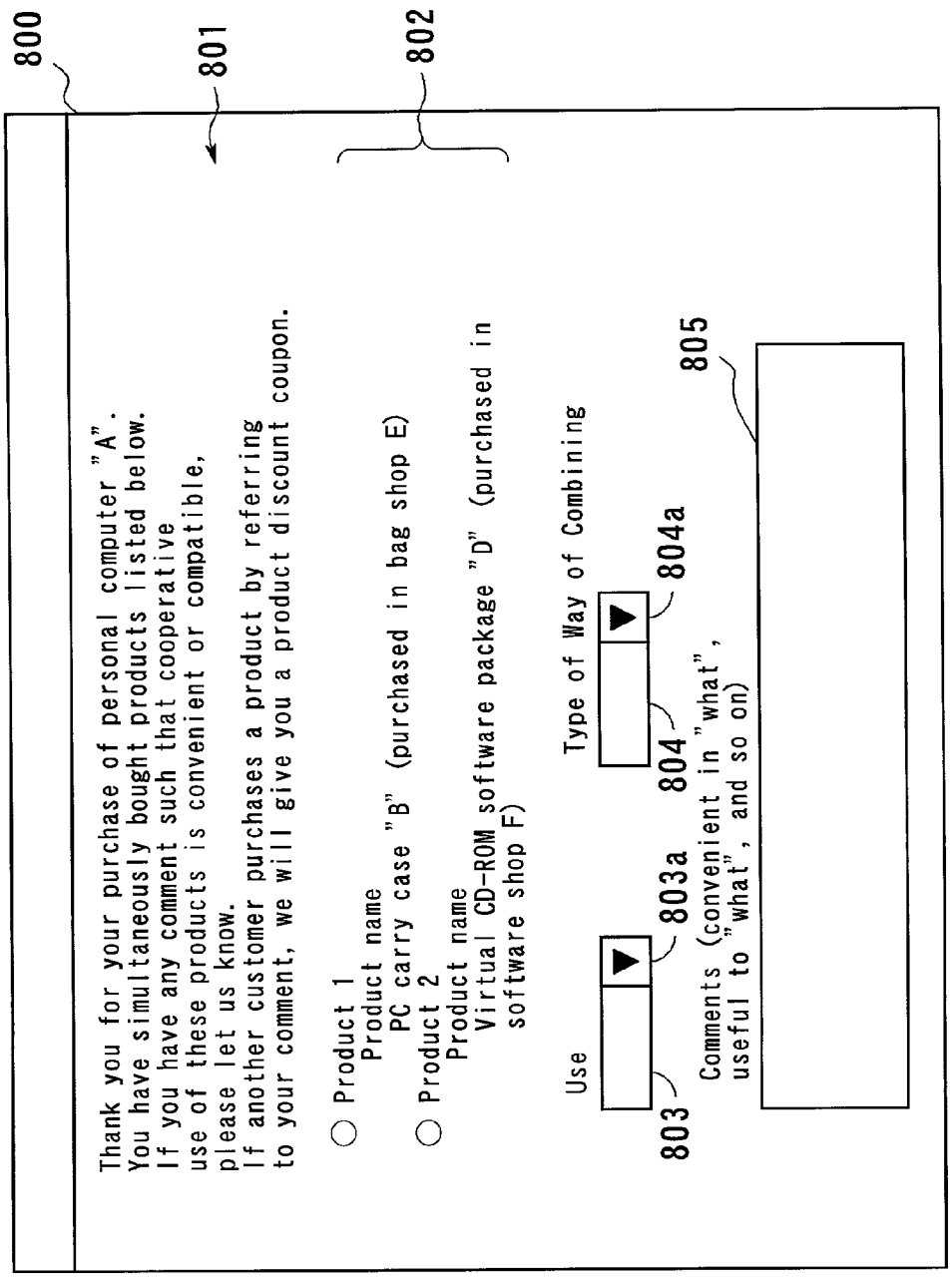
FIG. 8 is a view of a screen for asking a user who has bought a related product to make registration of combination information.

FIG. 8 illustrates an example of a screen that is displayed on the monitor 35 of the user terminal 3 and asks the person who has bought a product related to making registration of combination information about the related product.

A registration screen 800 is a Web page that is displayed at the terminal 3 and asks the user who bought the original product and its related product in step S710 shown in FIG. 7. More particularly, the screen 800 asks the person who bought personal computer "A" and simultaneously bought related products of PC carry case "B" and virtual CD-ROM software package "D" to make registration of combination information concerning combinations of the original product "A" with the related products "B" and "D".

The registration screen 800 has messages 801 and 802, and boxes 803, 804 and 805. The message 801 asks to make registration. The message 802 describes a list of products related to those that were bought. The box 803 is used to choose a use of the related products. The box 804 is used to choose a type of way of combining. The box 805 is used to describe a comment on the combination. When arrow parts 803a and 804a respectively attached to the boxes 803 and 804 are clicked, selectable input items come out. The user uses the keyboard to enter his/her comment in the box 805. The items of information entered in the boxes 803, 804 and 805 are sent to the service providing server 2, and are described in the items "type of use", "type of way of combining" and "comments of the combination information table 304 included in the database. Simultaneously, the "combination information ID" in the combination table 304 is described in the item combination information ID (registration)" in the purchase information 302 created by the purchase of the product "A".

Normally, the process for asking to make registration is executed when a given number of days lapses after execution of the step of incrementing the number of times a purchase of the related product has been made. In this case, steps S503 through S505 shown in FIG. are executed with regard to a use who has placed a buy order and has responded to a request for making registration of combination information via an e-mail or the like after the given number of days lapses. The combination information that should be made of record may include, in addition to a beneficial effect of the related product that has been bought by the user who makes registration, a complaint and a problem about the related product. The service providing server 2 may be provided with the function of inspecting or deleting information about which many complaints have been made. This could enhance the quality of combination information.

As described above, the service providing server 2 of the product information supply system 1 provides the users with sales service via the Internet 5 and supplies the users with combination information concerning products that the user desire to buy and other products related thereto. The combination information is registered in the database by the persons who have bought the products. Then, the search of various items of information in the database is conducted, and the users are supplied with resultant proper information. Thus, the users are supplied with useful information that could assist them in the purchase of products. Also, the combination information would bring the following advantage to the provider of the sales service. The user is guided in looking at a Web page that introduces related products in addition to the Web page of the original product. This would stimulate the user to buy a related product, so that the sales can be promoted.

The registration of combination information can be made with the service providing server 2 by using an e-mail created by the terminal 4 or a Web page opened thereat. Thus, it is possible to efficiently collect a lot of information. The number of persons who make registration of combination information could be increased by giving these persons a reward based on their combination information that contributes to assisting the users in making reference with the Web pages that introduce the related products or purchasing the related products. Further, it is possible to efficiently collect information to be registered with the database by asking the user who bought a product to make registration of combination information immediately after the purchase of the product or when a predetermined number of days lapses therefrom.

The above-mentioned product information supply system 1 has the database provided in the service providing server 2. Alternatively, the database may be provided in an exclusively used information supply server separate from the service providing server 2. In this case, the number-of-times accumulating part 2b and the registration page 2e may be provided in the exclusively used information supply server. The related product page 2d may be provided in yet another service providing server. In these cases, the Web site set up by the service providing server 2 handles only the online sales service. The external information supply servers are connected to the service providing server 2 via the network, and provide the Web sites with service of supplying combination information about products. For example, the user who looks at a Web page that introduces products on sale in the online shop chooses a product or places a buy order. Then, the service providing server 2 receives a signal indicative of the above choice or the buy order and inquiries the information supply server about combination information about this product. The information supply server searches the database to extract the requested combination information therefrom. The extracted combination information is once stored in the service providing server 2 and is then sent to the user terminal 3. Alternatively, the information supply server may send the extracted combination information directly to the user terminal 3. The above configuration could make it for the Web servers to share the service function of supplying combination information on the network.

The above-mentioned information supply server may be realized by an application service provider (abbreviated as ASP). The information supply server is provided, from the service providing server 2 or the person who sells the products, with a reward based on the number of times reference has been made to the page that introduces related products or the number of times a purchase has been made. In this case, the Web page for making registration of combination information may be provided by the service providing server 2 or the information supply server.

Marketing information may be produced from information extracted from the combination information stored in the database and sold to a third person who engages in business. FIG. 9 shows an example of marketing information produced from the database.

The marketing information that can be produced from the combination information stored in the database is classified into three types, namely, target-based marketing information 901, purchaser information 902, and product development/improvement information 903. The target-based marketing information 901 may include lists of recommended combinations of products based on, for example, the ages, purposes and tastes of the users. These lists may be created from information described in the user information 301 and the information 303 about the person who has made registration in the database, or the items of "type of use" and "type of way of combining" in the combination table 304. The conventional data mining may result in a trend in combination of products or a ratio of the purchasers in view of a given reference, which serve as combination information about products classified on the target-purchaser basis. In contrast, the items of the target-based marketing information 901 suggest the reason why products are bought in combination or a use of products. Thus, a detailed analysis about the combination of products may be facilitated.

The purchaser information 902 may be information concerning the purchasing actions of the users who utilized to the sales service to buy the products. For example, the purchaser information 902 may include a profile of products that were bought by the users, a list of products that were not purchased by the users although these products were recommended, and the attributes of the purchasers for each product. The product development/improvement information 903 may be information concerning the products that were sold. The information 903 may include products that were not purchased although combinations with these products were recommended. Also, the information 903 may include a list of items describing improvements that should be made to the combination information or products. Further, the information 903 may include a sales channel list used in a system having the database provided in an information supply server provided outside of the service providing server 2. The sales channel list may include sales channels obtained by classifying the sales service agencies that request the combination information in such a way as to show via what sales routes the products were sold.

FIG. 10 illustrates an example of a description of the contents of the marketing information that is produced in the above-mentioned way. The marketing information shown in FIG. 10 is titled "marketing report" and has a description about purchases who are in their twenties and simultaneously bought a notebook type personal computer (hereinafter simply referred to as a notebook PC). The marketing report shown in FIG. 10 describes that a combination of notebook PC "A" and PC carry case "B", and another combination of notebook PC "E" and PC carry case "F" enjoyed a favorable reputation from the users in view of color and design. The marketing report also describes that a combination of notebook PC "A" and PC carry case "B" enjoyed a favorable reputation from the users who are in their fifties because of "light" and "easy to carry". Further, the marketing report shown in FIG. 10 has a description of the ratio of simultaneous purchase on the age basis.

The marketing information mentioned above could be sold to product planners, manufacturers and distributors. This could make it possible to develop the total business about the sale of products using the product information supply system 1. As has been described previously, the product information supply system 1 is equipped with the various functions of making registration of a variety of information and enhancing the reliability of information. It is thus possible to extract highly reliable marketing information produced based on the information stored in the database. The marketing information thus produced would be very important to product developers, manufacturers and sellers.

The sales service using the service providing server 2 could give an affiliate reward regarding the sale of related products to an operator of a Web site with which a contract has been made via an affiliate system. In this case, the Web site based on the contract via the affiliate system indicates information about links to an online shop or mall set up by the service providing server 2. If a user assesses the contracted Web site to choose a desired piece of link information and buy a product, a reward will be given to the operator of the Web site. If the user receives combination information from the service providing server 2 and buys a product related to the combination information, the contracted Web site operator will be given a more reward. The marquee in the sales service could further be increased by making an affiliate contract with another Web site. This could increase the number of pieces of information stored in the database and supply more valuable combination information.

The processes executed by the service providing server 2 can be described in programs on a computer readable recording medium. A computer executes the programs to realize the functions of the service providing server 2. Typical examples of a computer-readable recording medium are a magnetic recording apparatus and a semiconductor memory. The programs may be stored in a portable recording medium such as a CD-ROM (Compact Disk Read Only Memory) or a floppy disk, which is easily available in the market. It is also possible to store the program in a storage device of a computer connected to a network and to transfer it to another computer through the network. When the computer executes the program, it is read from a hard disk drive or the like built in or externally connected to the computer and is loaded to the main memory.

As described above, according to an aspect of the present invention, a large amount of combination information that can be supplied to the users can be registered with and accumulated in the database by persons who have bought products via a network by means of a registration Web page or an e-mail. The information of record may include not only information specifying combinable products but also information regarding combinations of products, such as the effects of the combinations and the ways of using the combined products. A desired piece of combination information can be extracted from the database by the search thereof, and supplied to the users who desire to purchase products via the network. This makes it possible to supply the users with proper information about related products that could be bought in combination with the original products. Further, a supply of the combination information would stimulate the users to purchase some related products, so that the sales can be promoted by the above-mentioned cross sell. The function of supplying the users with combination information can be shared by a plurality of servers on the network.

Also, according to product information acquiring method, a server that manages a database storing combination information receives an inquiry about combination information that is made via a user terminal operated by a user who desires to buy a product. In response to the inquiry, the search of the database is conducted to extract a corresponding piece of combination information therefrom. The extracted piece of combination information is sent to the user terminal. The received combination information includes not only a piece of information specifying a combination of products but also a piece of information regarding the effect of a combination and the way of using products in combination. The combination information is registered with the database by the users who have bought the products that result in their combination information. Hence, the users could acquire proper information about related products that could be bought in combination with the original products.

The users who bought products in the past make registration of combination information with the database from terminals by an e-mail or access to the registration Web page. Thus, the combination information can easily be registered with the database. The person who has made registration of combination information receives a reward based on the number of times reference has been made to his/her combination information which guides another user in accessing a Web page that introduces related products or a reward based on the number of times a purchase of a related product has been made. This would stimulate the users to make registration of combination information.

The foregoing is considered as illustrative only of the principles of the present invention. Further, since numerous modifications and changes will readily occur to those skilled in the art, it is not desired to limit the invention to the extract construction and applications shown and desired, and accordingly, all suitable modifications and equivalents may be regard as falling within the scope of the invention in the appended claims and their equivalents.

What is claimed is:

1. A product information supply method comprising:
receiving combination information about combinations of products from a terminal of an individual who has bought the combination of products, wherein the combination information comprises a relationship between combined products, the relationship comprises at least one of compatibility, complement, and added value, and a type of use which indicates a use and a scene of which a related product of the combined products is useful to and a profile about the individual;

making registration of said combination information in a database, so that the combination information can be accumulated;

searching the database in response to inquiries about the combination information extracted from the database, wherein each of the inquiries corresponds to a choice signal that indicates a product chosen at a terminal of a consumer in order to specify a candidate for at least one purchase and place a buy order, and the combination information extracted from the database has been registered by an individual having a similar profile to the profile of the consumer;

supplying the terminal of the consumer the combination information which comprises the relationship between the combined products, a type of use, and a degree of usefulness of the combination information;

allowing a plurality of consumers to each purchase a same combination of products via a network, as that of the combination of products purchased by the individual; and determining priority of supplying a consumer with the combination information and the degree of usefulness based on a number of times a purchase of the same combination of products have been made based on the combination information, and based on a number of times reference has been made to a Web page that introduces the same combination of products described in the combination information as link information.

2. The product information supply method according to claim 1, wherein said inquiries are sent from terminals of said consumers.

3. The product information supply method according to claim 1, wherein said inquiries are sent by the terminals of the consumers via a Web server that provides an online shop that sells the products included in the combination of products.

4. The product information supply method according to claim 1, further comprising providing the individual who has made registration of the combination information with a reward based on the number of times a purchase of the same combination of products have been made on the basis of the combination information registered by said individual, or based on the number of times reference has been made to the Web page by the combination information.

5. The product information supply method according to claim 1, further comprising providing, from a seller who sells the combination of products or an operating person who operates the Web site, a managing person who manages the database, with a reward based on the number of times a purchase of the same combination of products have been made on the basis of the combination information registered by said individual, or based on the number of times reference has been made to the Web page by the combination information.

6. The product information supply method according to claim 1, wherein the combination information stored in the database is registered by an e-mail or a Web page for making registration.

7. The product information supply method according to claim 1, further comprising:

confirming that a buy order of the same combination of products is placed on the basis of the corresponding combination information extracted from the database and sent to the consumer; and sending an e-mail to the terminal of the consumer to ask the consumer to make registration of combination information to be stored in the database after a predetermined period lapses from confirmation.

8. The product information supply method according to claim 1, further comprising producing marketing information from the combination information, the marketing information being sold to another person or organization.

9. A computer readable recording medium storing a program for supplying a plurality of users who operate terminals to purchase a combination of products via a network, said program causing a computer to perform:

storing combination information about the combination of products that could be bought together;

registering combination information that has been supplied by a person who has bought the product, wherein the combination information comprises a relationship between combined products, the relationship comprises at least one of compatibility, complement, and added value, and a type of use which indicates a use and a scene of which a related product of the combined products is useful to, and a profile about the person;

searching the database on the basis of inquiries about the combination of products from the users, wherein each of the inquiries corresponds to a choice signal that indicates a product chosen at a terminal of a user in order to specify a candidate for at least one purchase and to place a buy order, extracting the combination information from the database that has been registered by a user having a similar profile to the user and sending the extracted corresponding combination information comprising the relationship between the combined products, a type of use, and a degree of usefulness of the combination information to the terminals of the users as requested; and storing a value indicating a reward based on a number of times a purchase of the same combination of products has been made by the users or a number of times reference has been made to a Web page that introduces the combination of products, when reference is made by another user to the combination information that has been registered by said person or reference is made to the Web page described in the combination information as link information; and determining priority of supplying a user with the combination information and the degree of usefulness based on the number of times a purchase of the same combination of products have been made based on the combination information, and based on the number of times reference has been made to the Web page by the corresponding combination information.

10. A product information supply apparatus comprising:

a database storing combination information about a combination of products purchased by a person, wherein the combination information comprises a relationship between combined products, the relationship comprises at least one of compatibility, complement, and added value, and a type of use which indicates a use and a scene of which a related product of the combined products is useful to, and a profile about the person;

registration making unit for making registration of combination information that has been supplied by the person who has bought the combination of products;

information outputting unit for searching the database on the basis of inquiry information about the combination of the products from users, wherein each of the inquiries corresponds to a choice signal that indicates a product chosen at a terminal of a consumer in order to specify a candidate for at least one purchase and to place a buy order, and the combination information extracted from the database has been registered by a consumer having a similar profile to the profile of the consumer and sending the extracted corresponding combination information comprising the relationship between the combined products, a type of use, and a degree of usefulness of the combination information to terminals of the users;

reward storing unit for storing a value indicating a reward based on a number of times a purchase of a same combination of products has been made by the users or a number of times reference has been made to a Web page that introduces the combination of products, when reference is made by another user to the combination information that has been registered by said person or reference is made to the Web page described in the combination information as link information; and priority determining unit for determining priority of supplying a user with the combination information and the degree of usefulness based on the number of times a purchase of the same combination of products have been made based on the combination information, and based on the number of times reference has been made to the Web page by the corresponding combination information.

* * * * *